E. H. DONAHOE.
VALVE.
APPLICATION FILED NOV. 24, 1911.

1,063,515.  Patented June 3, 1913.

UNITED STATES PATENT OFFICE.

EDWARD H. DONAHOE, OF PEORIA, ILLINOIS.

VALVE.

1,063,515.  Specification of Letters Patent.  Patented June 3, 1913.

Application filed November 24, 1911. Serial No. 662,162.

*To all whom it may concern:*

Be it known that I, EDWARD H. DONAHOE, citizen of the United States, residing at Peoria, in the county of Peoria and State of Illinois, have invented certain new and useful Improvements in Valves, of which the following is a specification.

My invention relates to valves.

More particularly my invention relates to a valve adapted for use in connection with drinking fountains, in which the user manipulates the valve to cause a temporary flow for drinking purposes.

My invention also involves structures associated with the common valve adapted to prevent a constant bleed or small flow to cause the water in the supply pipe to flow continuously and sufficiently to keep the water supply cool, and the cup washed off while in operation.

My invention consists in means which I will call a set valve provided in conjunction with the common valve that may be set so that when the valve is closed a flow or bleed therethrough is established.

Figure 1:
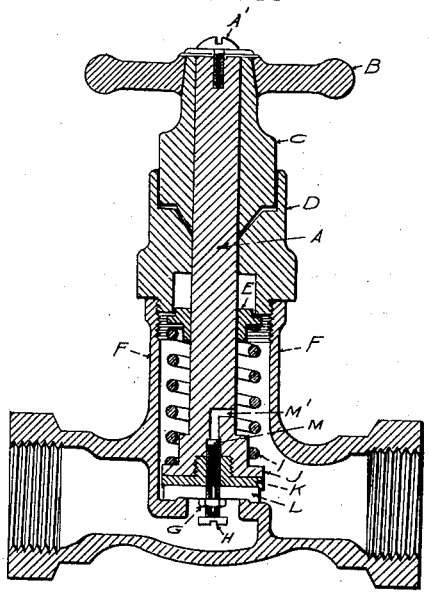
Figure 2:
Figure 3:
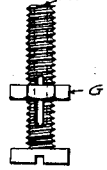

Referring to the drawings, Figure 1 is a vertical section through the valve; Fig. 2 is an end view of a set valve; and Fig. 3 is a side elevation showing the set valve.

My invention may be associated with any common valve comprising a body, stem and valve seats with means applied to manipulate the valve.

In the drawings, A is the valve stem; B the handle to operate the valve and A' a screw to hold the handle in place on the stem. C is a part of the body of the valve attached to stem A. D and F are parts of the body of the valve adapted by threaded connections to be separated. J is an extended portion of the lower part of stem A. K is a seat having a screw connection with the stem. L is a part of seat K adapted to bear over the inlet to the interior of the valve. E is a flanged cap adapted to form a bearing for the upper portion of spring I, the lower portion of the spring bearing upon the extended portion J of the stem. The parts I have just described are common parts of the valve.

Referring particularly to the structure adapted to carry out my invention, M is a circular threaded passageway in stem A and M' is a continuation of said passageway slightly reduced in size.

H is a hollow tube screw having slotted openings in its side. This screw is adapted to be manipulated upwardly or downwardly within circular opening M. G is a nut on screw H adapted to hold parts of the valve seat together.

The purpose of my invention is to provide a bleed valve to accomplish a continuous flow of the water to keep it cool and wash the cup. The flow of water is through the slots in screw H from a point below nut G and upwardly through the interior of the screw, the circular openings M and M' and from thence outwardly to the discharge point. The extent of flow will be regulated by the capacity of the slot entrances to the interior of the screw. By manipulating the screw downwardly the capacity of the slots will be increased, thereby increasing the flow. By manipulating the screw H upwardly the capacity of the slots will be diminished. In this manner the quantity of flow is regulated.

I do not desire to limit myself to the particular detail structure of the set or bleed valve herein shown as it may be structurally modified within the same operative principle accomplishing the same purpose, for instance, I have in mind a structure involving a screw similar to H except that it may be solid. Such a screw arranged in a position with relation to the body of the valve as shown in the drawings, if long enough to be screwed down far enough to strike the body of the valve, it could be set to hold valve L off of its seat a short distance sufficiently to permit a small flow therethrough.

Many modifications of the device might be made without departing from the spirit of my invention, and therefore I do not wish to be confined to the particular structure herein shown.

What I claim is:

1. In a valve, the combination with the valve and stem thereof, of a passageway therethrough, an adjustable hollow screw provided with a vertical slot through the wall thereof open below and above the valve and adapted for manipulation in said passageway so as to expose a portion of the slot below the main valve seat to permit a small flow through the screw and valve.

2. In a valve, in combination with the valve and stem thereof, of a way therethrough and a hollow screw provided with a vertical slot through the wall thereof open below and above the valve and adapted for manipulation in said way for the purpose of exposing the slot in the screw below the valve to permit a flow therethrough and through the main valve for the purpose of keeping the water in continuous movement.

3. In a valve, in combination with the valve and stem thereof, of a way through the valve stem and a hollow screw provided with a vertical slot through the wall thereof open below and above the valve and adapted for manipulation in said way for the purpose of exposing the slot in the screw below the valve to permit a flow therethrough and through the main valve for the purpose of keeping the water in continuous movement, and means for holding the valve parts together relative to the screw, substantially as shown.

In testimony whereof I have affixed my signature in presence of two witnesses.

EDWARD H. DONAHOE.

Witnesses:
  MARY E. COMEGYS,
  W. V. TEFFT.

---

Copies of this patent may be obtained for five cents each, by addressing the "Commissioner of Patents, Washington, D. C."